United States Patent [19]
Fetters et al.

[11] Patent Number: 5,238,634
[45] Date of Patent: Aug. 24, 1993

[54] DISENTANGLED CHAIN TELECHELIC POLYMERS

[75] Inventors: Lewis J. Fetters, Annandale; Edward N. Kresge, Watching; David Lohse, Bridgewater, all of N.J.

[73] Assignee: Exxon Chemical Patents Inc., Linden, N.J.

[21] Appl. No.: 817,573

[22] Filed: Jan. 7, 1992

[51] Int. Cl.$^5$ ............................................. B29C 47/88
[52] U.S. Cl. ............................ 264/184; 264/203; 264/204; 264/205; 264/210.8; 264/211.15; 264/211.16; 264/290.5
[58] Field of Search ................... 264/204, 203, 210.7, 264/210.8, 184, 205, 211.14–211.16, 290.5

[56] References Cited

U.S. PATENT DOCUMENTS

| | | |
|---|---|---|
| 3,812,224 | 5/1974 | Smith et al. .............. 264/331.13 |
| 4,344,908 | 8/1982 | Smith et al. .............. 264/204 |
| 4,436,689 | 3/1984 | Smith et al. . |
| 4,663,101 | 5/1987 | Kavesh et al. ............ 264/203 |
| 4,698,194 | 10/1987 | Tanaka et al. ............ 264/205 |
| 4,765,937 | 8/1988 | Hyon et al. ............... 264/205 |
| 4,810,450 | 3/1989 | Schellekens et al. . |
| 4,812,277 | 3/1989 | Mokveld et al. . |

FOREIGN PATENT DOCUMENTS

| | | |
|---|---|---|
| 756234 | 3/1971 | Belgium ....................... 264/204 |
| 0272717 | 6/1988 | European Pat. Off. . |
| 60-52326 | 3/1985 | Japan ........................... 264/210.8 |
| 60-167918 | 8/1985 | Japan ........................... 264/210.8 |
| 61-215708 | 9/1986 | Japan ........................... 264/210.8 |
| 2164897A | 4/1986 | United Kingdom . |
| 2164898A | 4/1986 | United Kingdom . |

OTHER PUBLICATIONS

Smith et al., *Colloid and Polymer Science*, 258(7), pp. 891–894, 1980.
Smith et al., *J. Polym. Sci., Poly. Phys. Ed.*, 19(5), pp. 877–888, 1981.
Smith, *Macromolecules*, 16(11), pp. 1802–1803, 1983.
Seguela, *Polymer*, 30(8), pp. 1446–1515, 1989.
Mohajor et al., *Polymer*, 1982, vol. 23, Sep., p. 1523.

Primary Examiner—Jeffery Thurlow
Attorney, Agent, or Firm—Catherine L. Bell; Myron B. Kurtzman

[57] ABSTRACT

The present invention provides a process for producing high elongation elastomers and highly oriented films and fibers from polymers having specific associative groups, such that the end groups on each macromolecule tend to associate with one another after the macromolecules are in a disentangled state, i.e., in the form of a semi-dilute solution. This association is of a force strong enough to prevent the macromolecular chains from slipping past one another and reentangling when the polymer is moderately heated or further concentrated in solution. The association may be manipulated, i.e., is reversible, under a change in parameter such as temperature, pH, polarity of the solvent medium and like parameters. The associated polymer macromolecules can be drawn as a gel from a semi-dilute solution into a highly aligned disentangled polymer to yield shaped articles.

20 Claims, 1 Drawing Sheet

STORAGE MODULUS VS. TEMPERATURE

○ AS CAST
× 2ND HEATING
□ AFTER MELTING
△ 3RD HEATING

DISENTANGLED CHAIN TELECHELIC POLYMERS

BACKGROUND OF THE INVENTION

This invention relates to a process for producing high-elongation polymer articles and highly oriented fibers and films from polymers having specific associating end groups.

DESCRIPTION OF RELATED ART

It is generally known in the field of polymer chemistry that the physical properties of shaped articles such as fibers and films composed of thermoplastic or elastomeric polymeric materials can be enhanced by stretching or elongating the polymer uniaxially in a single direction or biaxially in two mutually perpendicular directions during the shaping process. Such processes include melt spinning processes where a polymer strand is melt extruded into a zone where it is quickly cooled to below the melting point (Tm) and subsequently drawn at a draw ratio of from about 2 to about 6 to produce a solid oriented fiber. Analogous technologies also exist with respect to the production of uniaxially or biaxially oriented film materials.

Yet another technique for preparing oriented articles from polymers is to form a solution of the polymer in a solvent and transform this solution into a gel either by spinning the solution into a coagulating bath or by lowering the temperature of the solution to below the gel temperature or below the temperature where crystallites begin to form where the polymer is crystallizable. The gelled shape is then heated and drawn either subsequent to or simultaneously with the removal of the solvent by evaporation or extraction methods.

The thermoreversible gelation-gel drawing process described above is the basis for a wide range of methods for preparing high strength and high modulus polymeric articles. For example, U.S. Pat. No. 4,436,689 discloses a process for preparing filaments of high strength from linear ethylene polymers by spinning a solution containing up to 20% by weight of dissolved polyethylene at a temperature above the gel point, cooling the spun product to below the gel point, and stretching the shaped gel which may optionally still contain some of the solvent at a temperature of 75°-135° C. to form a filament having good tensile strength. Analogous processes as applied to polyethylene films are disclosed in UK Patents GB 2164897 A and GB 2164898 A, and analogous processes as applied to polyvinyl alcohol fibers are disclosed in U.S. Pat. Nos. 4,810,450 and 4,812,277.

The scientific basis for the production of high strength articles via the gel drawing process is fairly well understood. The mechanical properties of many polymer materials improve with drawing due, for example, to induced crystallization and/or improved chain orientation and alignment. The gel methods enhance the drawability of polyethylene and similar polymers (i.e., those which have relatively weak intermolecular forces) by reducing the number of chain entanglements that would otherwise be present. Experiments have demonstrated the enhanced drawability of gel-crystallized polyethylene versus melt-crystallized polyethylene and have determined the gel-crystallized polyethylene to have a lower entanglement density, as disclosed by Smith et al. i Colloid and Polymer Science, 258(7), pp. 891-4, 1980. It has also been shown that the generally increased drawability of gels formed from dilute polyethylene solutions versus those formed from concentrated solutions is a result of fewer entanglements in the dilute solution gels. See Smith et al., J. Polym. Sci., Polym. Phys. Ed., 19(5), pp. 877-8, 1981. In fact, the work with gels over the past several years has contributed significantly to the conclusion that the deformation behavior of polyethylene at drawing temperatures is dominated by its concentration of chain entanglements—see Smith, Macromolecules, 16(11), pp. 1802-3, 1983.

Seguela and Prud'homme have explored the mechanical properties of solution-crystallized and melt-crystallized hydrogenated block copolymers of butadiene-isoprene-butadiene as described in Polymer, 30(8), pp. 1446-15, 1989 (Chem. abs. No. CA111(16) 135778r). They found the melt-crystallized material to have good elastomeric properties due to the intermolecular crystallization of the hydrogenated polybutadiene blocks within microdomains that are phase-separated from the hydrogenated isoprene blocks. The solution-crystallized material, on the other hand, was brittle due to the intramolecular crystallization of its hydrogenated polybutadiene end blocks.

The entanglement of polymers is a direct result of their chain-like nature. Entanglement occurs only above a certain chain length or molecular weight generally designated as $M_e$ which is the molecular weight between entanglements in an undiluted polymer melt. The properties of the polymer change dramatically as the ratio between the weight average molecular weight ($M_w$) and $M_e$ increases, i.e., the number of entanglements increases over a given molecular weight. The higher this ratio, the poorer are the polymer flow properties and it becomes more difficult to produce polymers of high tensile strength, high hardness and high modulus by drawing techniques. In particular, the ability of crystallizable polymers to achieve high degrees of crystallinity and therefore the realization of ultimate mechanical properties is limited by the difficulties in fully orienting highly entangled polymer chains.

In this context it can be understood that polymers drawn from a polymer melt have generally inferior mechanical properties e.g., Young's modulus and tensile properties, because of the extremely high degree of chain entanglement occasioned by the melt history of the polymer which limits the degree of draw.

On the other hand, if such a polymer is dissolved in solvent to form a dilute solution, the degree of polymer entanglement is significantly reduced because the solvent medium allows the macromolecules to untwine and extend. Gel drawing processes such as described above attempt to take advantage of this state of polymer disentanglement by fixing the polymer in the disentanglement state by gelation, and then drawing the polymer in the gelled state to orient the polymer before the polymer chains can relax and entangle once again.

The problem which arises in such drawing processes is that the application of heat and solvent removal are necessary in order to orient the polymer chains and these are predominant factors which lead to polymer entanglement. Thus, the factors which induce macromolecular entanglement are at work prior to and during the drawing process, and there is thus a race to orient and recrystallize the polymer as quickly as possible before the polymer chains can reentangle under the influence of heat or as a consequence of increased polymer concentration in solution.

Some degree of reentanglement will inevitably occur in such processes unless a way can be found to maintain the polymers in the essentially disentangled state even when some degree of heat is applied or other factors favoring polymer reentanglement are at work.

SUMMARY OF THE INVENTION

Figure 1:
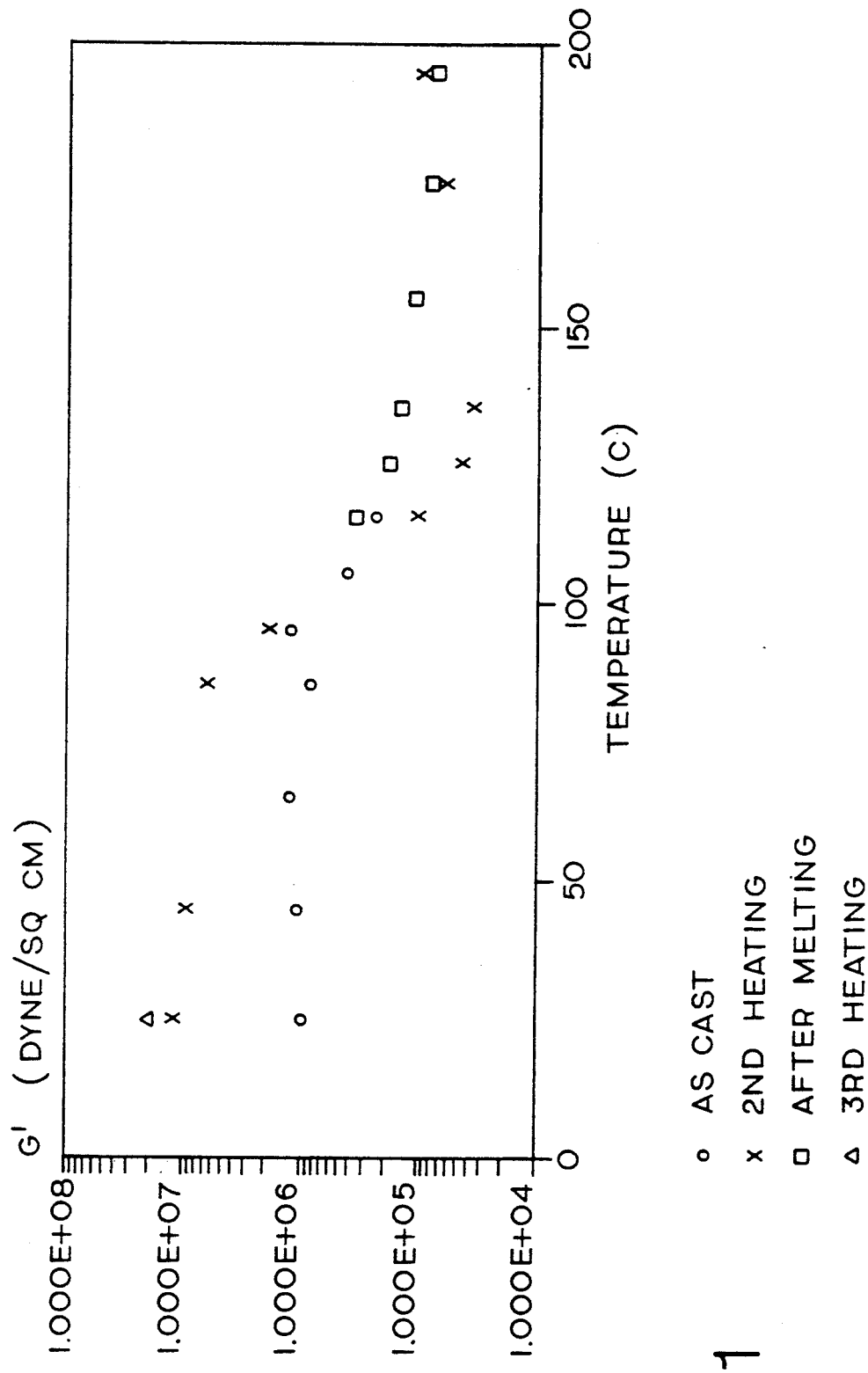
FIG. 1 is a graph of the Storage Modulus vs. The Temperature.

The present invention provides a process for producing high elongation elastomers and highly oriented films and fibers from polymers having specific associative groups. These polymers are generally referred to as telechelic polymers. These specific groups are such that the end groups on each macromolecule tend to associate with one another after the macromolecules are in a disentangled state, i.e., in the form of a semi-dilute solution. This association may be defined as an essentially physical interaction between chain end segments in contrast with a chemical covalent linkage, and is of a force strong enough to prevent the macromolecular chains rom slipping past one another and reentangling when the polymer is moderately heated or further concentrated in solution. The association may be manipulated, i.e., is reversible, under a change in parameter such as temperature, pH, polarity of the solvent medium and like parameters.

The associated polymer macromolecules can be drawn as a gel from a semi-dilute solution by techniques known in the art into a highly aligned disentangled polymer at draw ratios of 30 or more to yield shaped articles having a high dynamic modulus, high hardness and high tensile strength, if the chain is crystallizable. An ultra-low modulus elastomer is obtained if the polymer chain will not crystallize. Such non-crystallizable polymers generally exhibit a glass transition temperature of less than about 0° C.

DETAILED DESCRIPTION OF THE INVENTION

Telechelic polymers which may be processed in accordance with the present invention may be generally characterized by the structure —(X—B—X)—$_n$ wherein n is an integer of at least 1, the central unit B represents the predominant polymer species which is to be oriented or extended and each X represents the associating groups which can be made to preferentially associate and physically interact with one another after the polymer molecules have been placed in a disentangled state. This association of the X end groups traps or fixes the polymer in the disentangled state and prevents reentanglement of the chains for as long as the polymer is maintained at conditions which do not destroy the characteristics of the X end groups which cause them to preferentially associate with one another and for as long as the polymer is not subjected to conditions which cause the macromolecules to reentangle.

For the purposes of this invention, the term "telechelic" is intended to mean groups or polymer chain segments which are or can be made to be chemically or morphologically distinct from the polymer segment which separates these groups or polymer chain segments. The term "end groups" is intended to mean a positioning of telechelic functionality no closer along the polymer cain than $M_e$ which is defied above to be the chain length or molecular weight above which entanglements in an undiluted polymer melt will occur.

Thus, in the structure —(X—B—X)—$_n$ recited above, the X moiety would be truly an end group or end polymer segment where n is 1 and would be intermittently positioned along the polymer chain where n is greater than 1. In either case, the molecular weight or chain length of B would be equal to or above $M_e$ as defined above.

IN one embodiment of the invention, both the X and B segments of the polymer may be polymeric (a so-called block copolymer) and the association differential is determined by polymer morphology. For example, the central B segment may be composed of an amorphous or difficult-to-crystallize polymer segment such as a low density amorphous olefin polymer or copolymer and the X segments may each comprise crystallizable segments of a polymer derived from the same or difficult monomers. Conversely, the B segment may e a crystallizable polymeric material and the X segments may be non-crystallizable or difficult-to-crystallize segments. In either case, an association of the X groups may be established by forming a semi dilute solution of such a polymer at a temperature at or above the $T_m$ of the crystallizable segment. At this temperature there is little or no association between the X groups and the polymer has a minimum number of chain entanglements.

The temperature of the solution is then gradually lowered to a point below the $T_m$ of the crystallizable polymer segment during which time the crystallizable segments begin to crystallize out of solution to form a polymer gel. This developing differentiation in morphology causes the end segments of the polymer to associate with one another thereby preventing the macromolecules present in the central core segment of the polymer from slipping past one another and entangling.

The polymer may then be recovered by removing the solvent under conditions which do not involve reheating the polymer above $T_m$, or the polymer gel may be directly subjected to deformation processes known in the art to produce uniaxially or biaxially oriented shaped articles.

In yet another embodiment of the invention, the X and B segments of the polymer are each polymeric and the association differential is determined by differences of polarity in the X and B segments. For example, the central segment B may be composed of a polymer containing polar groups, such as carboxy or hydroxy groups, and the polymer end blocks X composed of a polymer which is non-polar such as a polymer derived from a hydrocarbon monomer. Conversely, the central B segment may be non-polar and the end segments X may be polar.

In either case, the association of the X groups is established by forming a semi-dilute solution of the polymer in a liquid which is capable of acting as a solvent for both the X and B polymer segments, but in which the X segments are insoluble or less soluble than the B segments at lower temperatures, heating the liquid to a temperature where each of the X and B segments are dissolved and the polymer is permitted to disentangle, and then gradually cooling the solution to a temperature well below that where the X segments of the polymer becomes less soluble in the solvent than the B segment such that a polymer gel is formed. This mutual insolubility causes the X segments of the polymer to associate as they precipitate out of solution and this association prevents the core segment of the polymer chain from reentangling.

In a variation of the above process which is not temperature dependent, a solvent system is selected which solvates both the X and B segments of the polymer to produce a disentangled polymer in solution. A second solvent different in polarity from the first is then mixed with the solution, the second solvent characterized as one which is a non-solvent or a poor solvent for the X segments of the polymer chain, but in which the B segments remain relatively more soluble. The resulting change in polarity of the solvent system causes the X segments to associate as they precipitate out of solution thereby forming a gel and locking the B polymer segments in their disentangled state. In instances where the X polymer segments are non-polar, then this second solvent would be a relatively polar solvent such as lower alkanols, ketones, ethers glycols, dimethyl sulfoxide and similar materials. Where the X polymer segments are polar, then the second solvent would be relatively non-polar such as an aromatic or aliphatic hydrocarbon and like materials.

In a variation of the mixed solvent process described above, association can also be established by selective removal of that solvent which solvates only the X or B polymer segments whereupon a gel will form. This can be accomplished by selective evaporation where the solvents have markedly different boiling points or by selective extraction of one solvent, e.g., methanol, using an extracting agent in which only that solvent is soluble, e.g., water.

In either case, the polymer may then be recovered by removal of the remaining solvent or the polymer gel may be directly subjected to deformation as described above.

In a further embodiment of the invention, the X groups in the X—B—X polymer structure need not be polymeric groups but rather may be ionic groups present as terminal groups on the main B polymer chain, which can be made to associate by changes in the temperature, polarity and/or pH of the solvent system in which the polymer is dissolved. This may be accomplished by in-situ transformation of terminal amino groups into zwitterions which are essentially neutral at the isoelectric pH of the polymer solution, or by the in-situ acid-base interaction of positively or negatively charged polymer end groups.

As in the cases described above, these association changes via ionic mechanism are made in-situ after the polymer containing these precursor ionic end groups are disentangled by forming a semi-dilute solution in a solvent for the polymer. Ionic association of these end groups establishes forces which tend to prevent the polymer from reentangling.

Polymer materials which may be processed in accordance with this invention include essentially any amorphous or crystallizable polymeric material including block copolymers containing the X—B—X structure set forth above or homopolymers or random copolymers containing terminal functional groups. The most preferred polymers are substantially linear and have a minimum degree of long chain branching. Inclusive of such polymers are block polymers wherein the X and B segments may be homopolymers of $C_2$ to $C_8$ monoolefins or copolymers of $C_2$ to $C_3$ monoolefins with each other or with a $C_4$ to $C_8$ monoolefin. Particularly preferred are such block copolymers containing crystallizable and non-crystallizable segments based on polyethylene, polypropylene, polyisobutylene, copolymers of ethylene and propylene, and copolymers of ethylene and/or propylene with $C_4$ to $C_{20}$ monoolefins such as butene, pentene or hexene. Such block polymers may be prepared using the so-called Ziegler-Natta coordination catalysts by sequential introduction and polymerization of a monomer or mixture of monomers by techniques known in the art such that block polymers having segments of different morphology are produced. Block polymers containing crystallizable segments composed of polyethylene or polypropylene and amorphous segments consisting of random copolymers of ethylene and propylene may be prepared by such sequential polymerization processes.

Other polymers which may be processed in accordance with this invention are diene polymers such as carboxy or hydroxy terminated polybutadienes, polyisoprenes, block or random copolymers of diolefin with unsaturated monomers such as styrene, acrylonitrile and lower alkyl acrylates or methacrylates. Also included are anionically polymerized diene polymers and block copolymers such as (poly) isoprene-butadiene-isoprene and (poly) butadiene-isoprene-butadiene block copolymers polymerized using lithium or alkyl lithium catalysts. These polymers may also be hydrogenated to produce saturated analogs of olefin block copolymers comprising polyethylene and ethylene/propylene block segments.

Still other polymers include graft copolymers, block copolymers produced utilizing coupling reactions, polymers containing polar end groups produced by post polymerization reactions, e.g., by the formation of zwitterions, or by coordination polymerization reactions.

Other polymers which may be processed in accordance with this invention include water and/or alcohol soluble polymers where the B segment is based on polyvinylalcohol, polyvinyl acetate, polyvinylpyrrolidone and like materials as well as polymers soluble in organic solvent such as polyamides, polyesters, polyoxymethylenes, polyalkyleneoxides, polystyrene, polyvinylchloride, polymers containing acrylic or methacrylic acid or lower alkyl esters thereof, and like materials.

The weight average molecular weight of the polymers which may be processed may range rom about 10,000 up to about 2,000,000. Preferred weight average molecular weights generally range from about 25,000 up to about 500,000.

Suitable solvents which can be selected for use in the process of the invention include cycloaliphatic or aromatic hydrocarbons such as benzene, toluene, xylene, naphthalene, cyclohexane, cyclopentane, tetralin and decalin as well as halogenated derivatives thereof such as mono or dichlorobenzene. Aliphatic hydrocarbon solvents may also be employed, including heptane, octane, nonane and decane. Relatively polar solvents which may be employed include lower alcohols such as methanol or ethanol, ketones such as methyl ethyl ketone and dimethyl ketone; glycols such as ethylene glycol and propylene glycol; polyether glycols such as polyethylene glycol and propylene glycols; ethers such as propylene glycol mono methyl ether and ethylene glycol mono methyl ether; dimethylsulfoxide; dimethylformamide; and like materials as well as combinations thereof.

As indicated above, the first stage of the process wherein the polymer is dissolved in solvent to form the disentangled macromolecules involves dissolution of the polymer in a solvent therefor to form what is referred to as a "semi-dilute" solution. By semi-dilute is meant a polymer concentration (the so called overlap concentration), at or slightly above which there is both a slight overlap of the polymer macromolecules and a minimum degree of macromolecular entanglement. In the dilute solution regime, there also exists little or no macromolecular entanglement, but the macromolecules may be spaced too far apart for the required associations of the X segments of the X—B—X polymer to take place. Above the semi-dilute regime, the macromolecules remain overlapped and can not sufficiently unravel and extend in the solvent such that the macromolecules remain substantially entangled.

The polymer concentration in the semi-dilute solution regime will vary depending upon such factors as the identity of the polymer, the molecular weight of the polymer and the degree of side chain branching. In general, and for most polymers, polymer concentrations in solvent within the range of from about 2 to about 20% by weight, more preferably from about 5 to about 15% by weight, and most preferably from about 7.5 to 12.5% by weight are sufficient to form semi-dilute solutions.

The disentangled polymer which is in solution at the semi-dilute concentration is then subjected to one of the steps described above to activate the association mechanism which causes the solution to form a gel. The solvent may then be removed from the gel such as by evaporation or extraction, or the gel itself still containing some or all of the solvent may be processed to produce oriented shaped articles by spinning and/or stretching processes known in the art. However, by separating the processes of orientation from disentanglement as set forth in the present invention, there is no need or requirement that the polymer be processed in the form of a solvent-containing gel or that the polymer not be moderately heated to assist in solvent removal provided that the forces causing the association of the polymer "X"0 end groups are sufficient to prevent polymer reentanglement when the polymer is subjected to conditions which favor polymer reentanglement. Nonetheless, the polymer should not be subjected to temperatures near or above the melting point or near or above the second order glass transition temperature, or to temperatures above which the association of the "X" end groups is established if lower than the above, prior to or apart from an orienting process because the association formed by the polymer "ZX" end groups will be destroyed under these conditions.

Shaped fibers, ribbons and films may be prepared by a hybrid process which combines the gel forming step and the shape forming step. By such a process, the semi-dilute solution of the polymer prepared as above may be formed into a shaped, solvent containing article by forcing the solution through a spinneret with a round or slit shaped aperture, or by extrusion, into a quenching zone under conditions wherein gelation of the shaped solution and association of the X end groups takes place. Thus, where association is turned on by cooling, the quenching zone may be a fluid such as liquid nitrogen or other cooled liquid. Where the association is turned on by differences in solvent solubility, the quenching zone may be a solvent or mixture of solvents in which the X polymer end groups are insoluble. Where the association is turned on by pH or ionic mechanisms, the quenching zone would be a solution containing reactants which cause the ionic change.

The gelled article thus formed may then be treated to remove all or a portion of the solvent form the gel. This may be accomplished by evaporation at room temperature or moderate temperatures below the gel dissolution temperature, or by passing the gelled shape through a liquid extraction zone wherein the solvent is extracted.

During or after extraction the shaped article may be stretched in one or more steps with a stretch ratio of at least about 10, and up to about 100 or more. The temperature during the stretching stage is generally kept below the melting point of the polymer where it is crystalline or semicrystalline, and generally above the glass transition temperature but below the decomposition temperature where the polymer is non-crystalline. Stretching temperatures generally within the range of about 75° C. and 250° C. are suitable for most polymers.

The conversion of the semi-dilute solution into a film may be carried out by pouring the semi-dilute solution onto a belt or roll capable of maintaining the solution in the desired shape, and subsequently cooling the liquid to form a gelled film. The gelled film may then be treated as stated above to remove all or a portion of the solvent, and subsequently passed into a heating zone wherein the film is uniaxially or biaxially stretched at elevated temperatures in the range of about 75° C. to about 250° C. as described above.

Such stretching processes are analogous to those disclosed in U.S. Pat. Nos. 4,812,277, 4,436,689 and GB 2164897A, the disclosures of each of which are incorporated herein by reference.

The following examples are illustrative of the invention.

EXAMPLE 1

A poly (butadiene-isoprene-butadiene) triblock polymer was anionically prepared by sequential polymerization of butadiene and isoprene in benzene solvent using sec-butyl lithium as the initiator at a concentration of about $10^{-4}$ molar. Polymerization was terminated by the addition of methanol as a capping agent.

The resulting block copolymer (B—I—B) had a weight average molecular weight of about 126,000, with each of the polybutadiene segments having a weight average molecular weight of about 24,000. The microstructure of the polybutadiene segments was about 40% cis 1,4, 50% trans-1,4, and 10% vinyl as determined by NMR, and the microstructure of the polyisoprene segments was about 70% cis 1,4units, about 20% trans 1,4units and the balance being 3,4 units.

The B—I—B block copolymer was then hydrogenated at 80° C. in cyclohexane solution (15g per liter) using 5 wt. % palladium on calcium carbonate as a catalyst at 4200 KPa hydrogen pressure for 20 hours. The catalyst was then filtered off at 70° C.

The resulting hydrogenated block copolymer was recovered by evaporating the solvent and was fond to be an analog of a polyethylene-ethylene/propylene copolymer-polyethylene block polymer wherein the polyethylene-like segments were semi-crystalline and contained minor amounts of a few randomly distributed 1-butene units occasioned by the low 1,2 microstructure content of the polymer starting material. This segment had a melting point of about 102° C. Less than 0.5 mole % of the butadiene units were not hydrogenated as determined by NMR. The central block composed of the ethylene/propylene alternating copolymer-like block was amorphous, and had a glass transition temperature ($T_g$) of about −62° C.

EXAMPLE 2

The hydrogenated polymer of Example 1 was dissolved in toluene at 100° C. at a semi-dilute concentration of 10 g. per 100 cc of solvent. This solution was then gradually cooled to 25° C., during which time the crystallizable polyethylene end segments crystallized out of solution to form a gel. The toluene was then removed from the gel by evaporation at room temperature to form a film.

EXAMPLE 3

The solid, solvent free polymer of Example 2 was laced in an aluminum mold and pressure applied for 15 minutes at 150° C. The shape was cooled to room temperature to provide a specimen having a thickness of 2 mm.

EXAMPLE 4

Stress strain properties of the samples were determined by pulling ring shaped samples on an Instron Tensile Tester at 25° C. he data up to point of break are set forth in Table 1.

TABLE 1

| | STRESS STRAIN PROPERTIES TENSILE STRESS, MPa | |
|---|---|---|
| PERCENT ELONGATION | SAMPLE FROM GEL EXAMPLE 2 | COMPRESSION MOLDED SAMPLE EXAMPLE 3 |
| 100 | 0.5 | 1.5 |
| 200 | 0.6 | 2.5 |
| 400 | 0.8 | 4.1 |
| 800 | 0.9 | 8.5 |
| 1000 | 0.9 | 8.5 (BROKE) |
| 2000 | 1.3 | — |
| 4000 | 2.1 | — |
| 5200 | 2.4 (BROKE) | — |

After the samples broke, they returned to nearly their original length.

The sample of Example 2 had a weight swell ratio in n-heptane at 25° C. of 7.25 after 96 hours.

The sample of Example 3 had a swell ratio of 2.08 under the same conditions.

The rheological properties of the polymer from Example 2 were determined on a Rheometrics Mechanical Spectrometer using 25 mm diameter parallel plates. The results are shown in FIG. 1 for the storage (elastic) modulus G' as a function of temperature. The initial modulus is about $6 \times 10^5$ dynes/cm$^2$ and increases slightly as the sample is heated. G' then drops to about $1 \times 10^5$ dynes/cm$^2$ as the melting point of the polyethylene end segment is reached. After melting the first time G' increases to a value slightly over $1 \times 10^7$ dynes/cm$^2$. The initial room temperature modulus corresponds to having only around 3 entanglements per midblock, rather tan the 60 or so that wold be expected in the bulk state and which is seen from the final value. This shows how nearly all of the entanglements have been removed from the sample of Example 2.

The process and polymers disclosed herein are useful in the production of low modulus elastomers and ultra high modulus fibers depending upon the specific composition. Crystalline polymers in the highly aligned form have very low diffusion rates for small molecules making films of these materials exceptionally attractive as packaging materials.

What is claimed is:

1. A process for forming an oriented shaped polymeric article comprising:
   a. providing a telechelic polymer comprising the structure —(X—B—X)$_n$— wherein B is a polymeric segment, each X is a telechelic group capable of associating and is no closer along the polymer chain than the molecular weight between entanglements in an undiluted melt of said telechelic polymer, and n is an integer of at least 1, said polymer having a weight average of at least about 10,000;
   b. dissolving said polymer in a solvent therefore to form a semi-dilute solution of about 2 to 19 weight percent polymer, such that the polymer chains align in an essentially disentangled state;
   c. subjecting said solution to a condition which causes the polymer telechelic groups to selectively associate while maintaining said polymer chains in the essentially disentangled state;
   d. recovering said polymer under conditions which substantially maintain the telechelic association created in step (c); and
   e. shaping and stretching said recovered polymer at a temperature above the glass transition temperature of said polymer but below the melting point of said polymer employing a draw ratio of at least about 10.

2. The process of claim 1 wherein said condition (c) selective association is by morphological, ionic or temperature mechanism.

3. The process of claim 2 wherein said condition (c) is an ionic mechanism.

4. The process of claim 1 wherein the article produced is a film.

5. The process of claim 2 wherein said condition (c) is a solvent mechanism which alters the solubility of said X or B polymer segments in said solvent.

6. The process of claim 1 wherein X and B are each polymeric segments and the X segments are capable of associating by morphological mechanism.

7. The process of claim 6 wherein said condition (c is a temperature mechanism.

8. The process of claim 7 wherein said X polymer segments are crystallizable and said B polymer segment is essentially amorphous.

9. The process of claim 8 wherein said condition (c) includes the step of heating said solution from step (b) to a temperature at or above the melting point of said polymer and gradually cooling said solution to a temperature below the melting point of said polymer such that said X polymer segments are caused to crystallize.

10. The process of claim 6 wherein said polymer is an olefin polymer.

11. The process of claim 10 wherein said X segments are polyethylene block polymer segments and said B segment is an ethylene/propylene copolymer segment.

12. A process for forming an oriented shaped polymeric article comprising:
   a. providing a block copolymer having the structure X—B—X wherein X and B are selected from the group consisting of crystallizable polymer segments and non-crystallizable polymer segments, with the proviso that when X is crystallizable, B is non-crystallizable and when X is non-crystallizable, B is crystallizable, said block copolymer further characterized by a weight average molecular weight within the range of from about 10,000 up to about 2,000,000 and having a content of crystallized or non-crystallized B polymer segment of at least about 50% by weight of said copolymer X being further characterized as being no closer along the polymer chain than the molecular weight between entanglements in an undiluted melt of said telechelic polymer;

b. dissolving said polymer in a solvent therefore to form a semi-dilute solution of about 2 to about 19 weight percent polymer;

c. heating said solution to a temperature at or above the melting point of said polymer;

d. cooling said solution to a temperature below the melting point of said polymer such that a shaped polymer gel is formed and such that the associated end groups prevent substantial reentanglement after initial disentanglement; and e. stretching said shaped gel, during or after solvent removal, at a temperature above the glass transition temperature of said polymer but below the melting point of said polymer employing a draw ratio of at least about 10.

13. The process of claim 12 wherein said X polymer segments are crystallizable and said B polymer segments are non-crystallizable.

14. The process of claim 12 wherein the X and B segments of said polymer are selected from the group consisting a homopolymer of a $C_2$ to $C_8$ monoolefin and copolymers of ethylene and propylene with one another or with one or more $C_4$ to $C_8$ monoolefins.

15. The process of claim 12 wherein said semi-dilute solution has a polymer concentration of from about 2 to about 20% by weight.

16. The process of claim 15 wherein said semi dilute solution has a polymer concentration of from about 5 to about 15% by weight.

17. The process of claim 12 wherein said polymer has a weight average molecular weight within the range of from about 25,000 up to about 500,000.

18. The process of claim 12 wherein said heated semi-dilute solution of step (c) is shaped by spinning said solution into a cooling zone where said shaped polymer gel of step (d) is formed.

19. A process for forming an oriented polymer comprising:

a. dissolving a polymer with associative end groups in a solvent to form a semi-dilute solution of about 2 to about 19 weight percent polymer where the end groups are no closer along the polymer chain than the molecular weight between entanglements in an undiluted melt of said telechelic polymer;

b. altering the semi-diluted solution formed by step (a) such that the end groups preferably associate with other end groups to form a gel and the polymer chain is prevented from substantially reentangling after initial disentanglement, c. recovering the shaped oriented polymer, during or after solvent removal, by subjecting the gel to deformation, drawing, spinning or stretching.

20. The process of claim 19, wherein the article formed is a film.

* * * * *